(No Model.)
S. S. BARRIE.
BAND PULLEY.
No. 380,077. Patented Mar. 27, 1888.
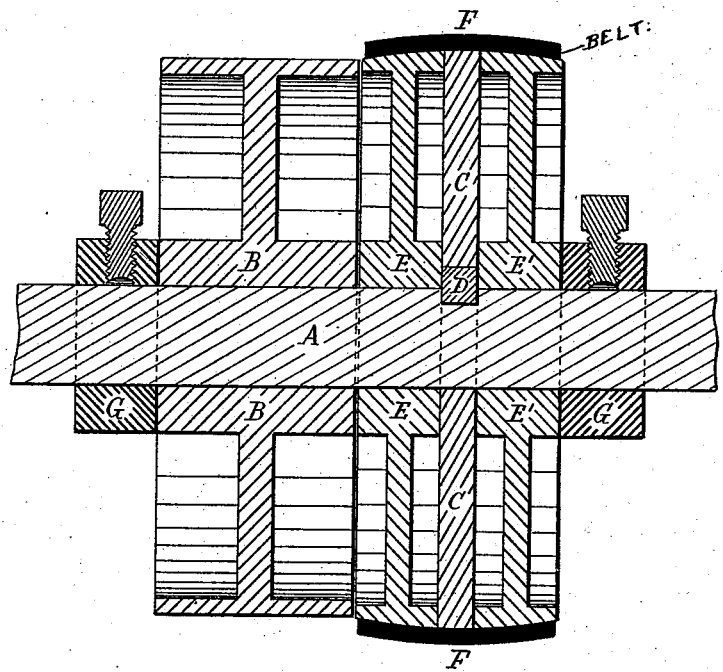
WITNESSES,
Wm A. Lowe,
F. v. Biesen,
INVENTOR
Samuel S. Barrie.

UNITED STATES PATENT OFFICE.

SAMUEL S. BARRIE, OF BROOKLYN, NEW YORK.

BAND-PULLEY.

SPECIFICATION forming part of Letters Patent No. 380,077, dated March 27, 1888.

Application filed October 29, 1887. Serial No. 253,679. (No model.)

*To all whom it may concern:*

Be it known that I, SAMUEL S. BARRIE, a citizen of the United States, residing at Brooklyn, in the county of Kings and State of New York, have invented a new and useful Improvement in Band-Pulleys, of which the following is a specification.

My invention relates to that class of band-pulleys termed "fast" and "loose" pulleys, on which is employed a belt that may be shifted from the pulley which turns freely on the shaft to the pulley which is fast to the shaft for the purpose of driving machines at desired intervals, while the belt leading from a band-pulley on the main or line shaft is running continuously at a uniform rate of speed.

The object of my invention is to provide means for overcoming excessive strain on the belt and shafting while putting in motion dead-weights, as a massive grindstone, or in putting in motion machines that are required to run at high speed, as a loaded hydro-extractor. In starting up such machines with pulleys as ordinarily constructed the entire contact-surface of the belt must slip on the fast pulley until the maximum speed of the machine is attained, and if the shafting resists the shock the belt is liable to stretch, run off, or break.

I attain the object of my invention by the device illustrated in the accompanying sectional view, in which—

A represents a counter-shaft which may be supported in position by any of the usual methods, and on which may be placed one or more driving pulleys, sprockets, or gears for the purpose of communicating motion to the machines to be driven.

B is an ordinary loose band-pulley to carry a belt leading from a band-pulley on the main or line shaft when the counter-shaft A is at rest.

On the shaft A, contiguous to the loose pulley B, I make use of a sectional pulley, preferably of metal, and consisting of three divisions or sections, of which the central section, C, is secured to the shaft by means of the lug or key D, and which section has a smooth crowning-face to facilitate the slipping of the belt thereon while overcoming the resistance of the load, and the crown of this face is made to project somewhat above the faces of the other sections in order to secure sufficient pressure of the belt thereon to gradually put in motion the machinery to be driven. The other two sections, E and E', revolve freely on the shaft A. The belt F, being driven by a band-pulley on the main shaft, is supported by the loose pulley B when not performing work; but on being shifted on the sectional pulley it is supported by the loose sections E and E' and slips on the central section, C, without damage or strain on the shaft; yet the belt has sufficient hold on the section C to gradually put in motion the shaft A and the machine to which it may be connected, and the motion is accelerated until the shaft A is driven at its maximum speed, when the sections E, E', and C travel together at the same speed. The collars G G serve to retain the pulleys in their proper positions on the shaft A.

What I claim as my invention, and desire to secure by Letters Patent, is—

1. The combination, with a shaft to be rotated, of a band-pulley consisting of three independent sections arranged side by side, the central section being fast on the shaft and having a smooth crowning-face to favor the temporary slipping of a belt thereon while augmenting the speed of the machinery to be driven and the two outside belt-supporting sections free to revolve upon the shaft, and a belt approximately the width of the three sections, by means of which the speed of the shaft is accelerated as the resistance of the load is overcome, substantially as described.

2. The combination, with the shaft A, the loose pulley B, the belt F, and the collars G G, of a band-pulley consisting of three sections, C, E, and E', substantially as and for the purpose herein described.

SAMUEL S. BARRIE.

Witnesses:
F. V. BRIESEN,
HENRY E. ROEDER.